US012613687B2

(12) United States Patent
Dey et al.

(10) Patent No.: US 12,613,687 B2
(45) Date of Patent: Apr. 28, 2026

(54) METHODS AND SYSTEMS FOR DYNAMICALLY CREATING UPGRADE SPECIFICATIONS BASED ON PER DEVICE CAPABILITIES

(71) Applicant: Pensando Systems Inc., Milpitas, CA (US)

(72) Inventors: Chinmoy Dey, West Bengal (IN); Hareesh Ramachandran, Bangalore (IN); Kalyan Bade, Bangalore (IN)

(73) Assignee: Pensando Systems Inc., Milpitas, CA (US)

( * ) Notice: Subject to any disclaimer, the term of this patent is extended or adjusted under 35 U.S.C. 154(b) by 325 days.

(21) Appl. No.: 17/573,512

(22) Filed: Jan. 11, 2022

(65) Prior Publication Data

US 2023/0221940 A1 Jul. 13, 2023

(51) Int. Cl.
G06F 8/65 (2018.01)

(52) U.S. Cl.
CPC ...................................... G06F 8/65 (2013.01)

(58) Field of Classification Search
CPC ................. G06F 8/61; G06F 8/65; G06F 8/71
See application file for complete search history.

(56) References Cited

U.S. PATENT DOCUMENTS

| 6,698,017 | B1 | 2/2004 | Adamovits et al. | |
| 8,429,605 | B2 * | 4/2013 | Cruise ................... | G06F 9/4498 |
| | | | | 717/109 |
| 9,229,902 | B1 | 1/2016 | Leis et al. | |
| 9,886,262 | B2 | 2/2018 | Thomas et al. | |
| 10,089,099 | B2 | 10/2018 | Chang et al. | |
| 10,248,671 | B2 | 4/2019 | Buehne et al. | |
| 10,445,089 | B2 * | 10/2019 | Regmi .................. | H04L 41/145 |
| 2010/0153941 | A1 | 6/2010 | Borissov et al. | |
| 2014/0258999 | A1 * | 9/2014 | Katihar ..................... | G06F 8/61 |
| | | | | 717/168 |
| 2016/0315803 | A1 * | 10/2016 | Sadana ................. | H04L 41/082 |
| 2017/0168803 | A1 * | 6/2017 | Katiyar ..................... | G06F 8/65 |
| 2017/0235561 | A1 * | 8/2017 | Butler ...................... | G06F 8/654 |
| | | | | 717/168 |
| 2019/0369980 | A1 * | 12/2019 | Mair ........................ | H04L 67/10 |

FOREIGN PATENT DOCUMENTS

EP 3182678 B1 11/2018

* cited by examiner

*Primary Examiner* — Duy Khuong T Nguyen

(57) ABSTRACT

Upgrading a network appliance to a second firmware is dynamically specified and implemented to minimize network disruption. The installed firmware runs in a first execution domain and the second firmware runs in safe mode in a second execution domain. Upgrade planning data is produced by monitoring service executables in the second execution domain for stage failures at various execution states. The upgrade planning data is used to produce an upgrade specification for upgrading from the installed firmware to the second firmware. The upgrade planning data can indicate that there are execution state dependencies between the service executables. The upgrade specification can be adapted for the execution state dependencies and used by a finite state machine to implement the upgrade.

20 Claims, 14 Drawing Sheets

500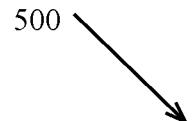

| Upgrade State Enumeration | Upgrade State Name | Upgrade State Execution Domain |
|---|---|---|
| First Upgrade Step | Compatibility Check | Domain A |
| Second Upgrade Step | Start | Domain A |
| Third Upgrade Step | Back Up | Domain A |
| Fourth Upgrade Step | Prepare | Domain B |
| Fifth Upgrade Step | Ready | Domain B |
| Sixth Upgrade Step | Configuration Replay | Domain B |
| Seventh Upgrade Step | Synchronize | Domain B |
| Eighth Upgrade Step | Pre-Switchover | Domain A |
| Nineth Upgrade Step | Switchover | Domain B |
| Tenth Upgrade Step | Roll Back | Domain B |
| 11th Upgrade Step | Repeal | Domain A |
| 12th Upgrade Step | Finish | Domain A |
| 13th Upgrade Step | exit | N/A |

FIG. 5

600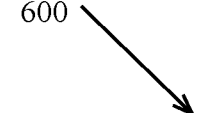

| Service Enumeration | Service Executable Indicator |
|---|---|
| First Service | sysmgr |
| Second Service | pciemgr |
| Third Service | pdsagent |
| Fourth Service | vpp |
| Fifth Service | operd |

FIG. 6

Upgrade Specification    701

| Service List    702 |
| --- |
| sysmgr |
| pciemgr |
| pdsagent |
| vpp |
| operd |

| Defaults    703 |
| --- |
| Sequence = Parallel |
| Timeout = 60000 ms |
| Discovery Flag = false |
| Execution Domain = Domain A |
| State Preprocessing Indicator = null |
| State Post Processing Indicator = null |

First Upgrade State Specification    704

| State Name = CompatCheck | |
| --- | --- |
| Next On OK = Start | Next On Failure = exit |
| Next On Critical Failure = exit | Next On Timeout = exit |
| State Preprocessing Indicator (e.g., "hitless.sh") | Discovery Flag = true |

Second Upgrade State Specification    705

| State Name = Start | State Preprocessing Indicator = hitless.sh |
| --- | --- |
| Sequence = Serial | Service Order = pdsagent, vpp, operd |
| Next On OK = Backup | Next On Failure = Repeal |
| Next On Critical Failure = exit | Next On Timeout = Repeal |

Third Upgrade State Specification    706

| State Name = Back Up | State Post Processing Indicator = hitless.sh |
| --- | --- |
| Next On OK = Prepare | Next On Failure = Repeal |
| Next On Critical Failure = exit | Next On Timeout = Repeal |

Fourth Upgrade State Specification    707

| State Name = Prepare | State Preprocessing Indicator = hitless.sh |
| --- | --- |
| Sequence = Serial | Service Order = pdsagent |
| Next On OK = Ready | Next On Failure = Repeal |
| Next On Critical Failure = Repeal | Next On Timeout = Repeal |

FIG. 7A

Upgrade Specification (continued)     701

Fifth Upgrade State Specification     708

| State Name = Ready | State Post Processing Indicator = hitless.sh |
|---|---|
| Discovery Flag = true | Execution Domain = Domain B |
| Next On OK = Configuration Replay | Next On Failure = Repeal |
| Next On Critical Failure = Repeal | Next On Timeout = Repeal |

Sixth Upgrade State Specification     709

| State Name = Configuration Replay | |
|---|---|
| Timeout = 30000 ms | Execution Domain = Domain B |
| Next On OK = Synchronize | Next On Failure = Roll Back |
| Next On Critical Failure = Roll Back | Next On Timeout = Roll Back |

Seventh Upgrade State Specification     710

| State Name = Synchronize | Execution Domain = Domain B |
|---|---|
| Sequence = Serial | Service Order = pdsagent, vpp |
| Next On OK = Pre-Switchover | Next On Failure = Roll Back |
| Next On Critical Failure = Roll Back | Next On Timeout = Roll Back |

Eigth Upgrade State Specification     711

| State Name = Pre-Switchover | State Post Processing Indicator = hitless.sh |
|---|---|
| Next On OK = Switchover | Next On Failure = Roll Back |
| Next On Critical Failure = exit | Next On Timeout = Roll Back |

Ninth Upgrade State Specification     712

| State Name = Switchover | Execution Domain = Domain B |
|---|---|
| Timeout = 5000 ms | State Post Processing Indicator = hitless.sh |
| Sequence = Serial | Service Order = pdsagent |
| Next On OK = Finish | Next On Failure = Roll Back |
| Next On Critical Failure = exit | Next On Timeout = Roll Back |

FIG. 7B

Upgrade Specification (continued) <u>701</u>

| Tenth Upgrade State Specification <u>713</u> | |
|---|---|
| State Name = Roll Back | Execution Domain = Domain B |
| Timeout = 5000 ms | Sequence = Serial | Service Order = pdsagent |
| Next On OK = Repeal | Next On Failure = Repeal |
| Next On Critical Failure = Repeal | Next On Timeout = Repeal |

| 11th Upgrade State Specification <u>714</u> | |
|---|---|
| State Name = Repeal | Sequence = Serial | Service Order = pdsagent, vpp, pciemgr |
| Next On OK = exit | Next On Failure = exit |
| Next On Critical Failure = exit | Next On Timeout = exit |

| 12th Upgrade State Specification <u>715</u> | |
|---|---|
| State Name = Finish | Sequence = Serial | Service Order = vpp, pdsagent, pciemgr |
| Next On OK = exit | Next On Failure = exit |
| Next On Critical Failure = exit | Next On Timeout = exit |

| 13th Upgrade State Specification <u>716</u> |
|---|
| State Name = exit |

FIG. 7C

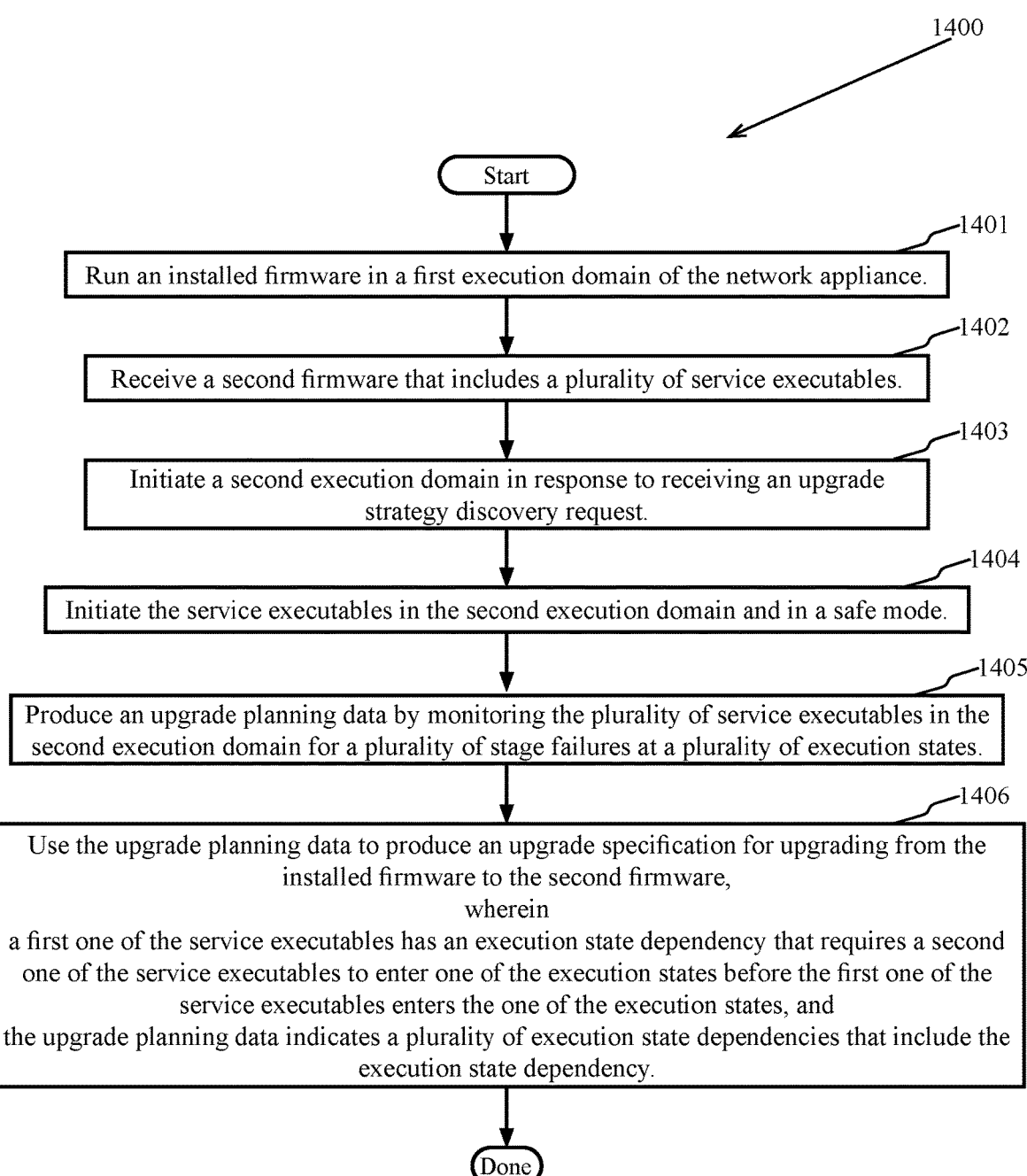

1400

Start

1401

Run an installed firmware in a first execution domain of the network appliance.

1402

Receive a second firmware that includes a plurality of service executables.

1403

Initiate a second execution domain in response to receiving an upgrade strategy discovery request.

1404

Initiate the service executables in the second execution domain and in a safe mode.

1405

Produce an upgrade planning data by monitoring the plurality of service executables in the second execution domain for a plurality of stage failures at a plurality of execution states.

1406

Use the upgrade planning data to produce an upgrade specification for upgrading from the installed firmware to the second firmware,
wherein
a first one of the service executables has an execution state dependency that requires a second one of the service executables to enter one of the execution states before the first one of the service executables enters the one of the execution states, and
the upgrade planning data indicates a plurality of execution state dependencies that include the execution state dependency.

Done

FIG. 14

METHODS AND SYSTEMS FOR DYNAMICALLY CREATING UPGRADE SPECIFICATIONS BASED ON PER DEVICE CAPABILITIES

TECHNICAL FIELD

The embodiments relate to computing systems, network appliances, smart network interface cards (NICs), channel adapters, network interface cards, routers, switches, load balancers, data centers, software upgrades, firmware upgrades, and to tailoring the upgrade to the individual device being upgraded.

BACKGROUND

Upgrading computers and the applications that run on those computers is a familiar process. A less familiar process is upgrading the firmware and software of network appliances such as switches, routers, load balancers, network interface cards (NICs), and distributed service cards (DSCs) which are often called smartNICs. The communications infrastructure of data centers can easily include, and rely on, tens of thousands of network appliances. Upgrading the network appliances can temporarily degrade the performance and efficiency of the entire data center even when the upgrade process goes well. Such degradation affects the data center's ability to deliver the quality of service it is contractually obligated to provide its clients. A hitless upgrade is an upgrade that can be accomplished without interrupting network communications. A graceful upgrade can affect network communications but does not take a network appliance out of service. A restart upgrade temporarily takes a network appliance out of service. Data centers therefore prefer that all upgrades be hitless, or graceful when hitless is not possible.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include running an installed firmware in a first execution domain of the network appliance, receiving a second firmware that includes a plurality of service executables, initiating a second execution domain in response to receiving an upgrade strategy discovery request, initiating the service executables in the second execution domain and in a safe mode, producing an upgrade planning data by monitoring the plurality of service executables in the second execution domain for a plurality of stage failures at a plurality of execution states, and using the upgrade planning data to produce an upgrade specification for upgrading from the installed firmware to the second firmware, wherein a first one of the service executables has an execution state dependency that requires a second one of the service executables to enter one of the execution states before the first one of the service executables enters the one of the execution states, and the upgrade planning data indicates a plurality of execution state dependencies that include the execution state dependency.

Another aspect of the subject matter described in this disclosure can be implemented by a system. The system can include a network appliance that is configured to run an installed firmware in a first execution domain, initiate a second execution domain in response to receiving an upgrade strategy discovery request that includes a second firmware that includes a plurality of service executables, initiate the service executables in the second execution domain and in a safe mode, produce an upgrade planning data by monitoring the plurality of service executables in the second execution domain for a plurality of stage failures at a plurality of execution states, and perform an upgrade from the installed firmware to the second firmware in accordance with an upgrade specification that is produced using the upgrade planning data, wherein the upgrade planning data is used to determine an upgrade type that is one of a plurality of upgrade types that includes a hitless upgrade type and a graceful upgrade type, the upgrade is a hitless upgrade when the upgrade type is the hitless upgrade type, and the upgrade is a graceful upgrade when the upgrade type is the graceful upgrade type.

Yet another aspect of the subject matter described in this disclosure can be implemented by a system. The system can include a means for producing an upgrade planning data for upgrading a network appliance from an installed firmware to a second firmware, a means for determining an upgrade type for upgrading the network appliance, a means for using the upgrade planning data to produce a hitless upgrade specification, a means for using the upgrade planning data to produce a graceful upgrade specification, a means for upgrading the network appliance using the hitless upgrade specification when the upgrade type indicates a hitless upgrade, and a means for upgrading the network appliance using the graceful upgrade specification when the upgrade type indicates a graceful upgrade.

In some implementations of the methods and devices, the network appliance produces the upgrade specification. In some implementations of the methods and devices, the method includes sending the upgrade strategy discovery request to the network appliance. In some implementations of the methods and devices, the upgrade specification specifies a hitless upgrade. In some implementations of the methods and devices, the upgrade specification specifies a graceful upgrade. In some implementations of the methods and devices, the upgrade specification specifies a restart of the network appliance. In some implementations of the methods and devices, one of the stage failures indicates that the second firmware is incompatible with a logical interface that is in the first execution domain. In some implementations of the methods and devices, one of the stage failures indicates that the second execution domain has insufficient memory for a packet processing pipeline table duplication operation. In some implementations of the methods and devices, one of the stage failures indicates that the second execution domain has insufficient memory for running the service executables.

In some implementations of the methods and devices, the upgrade specification specifies a finite state machine for moving the service executables among the execution states. In some implementations of the methods and devices, the network appliance is automatically upgraded to the second firmware because the upgrade specification specifies a hitless upgrade. In some implementations of the methods and devices, the upgrade strategy discovery request indicates automatically performing the hitless upgrade. In some implementations of the methods and devices, the method includes receiving an upgrade planning data collection from a plurality of network appliances and the network appliance, the upgrade planning data collection including the upgrade planning data; and using the upgrade planning data collection to produce an upgrade report, wherein the upgrade report associates the network appliances with a plurality of upgrade types and a plurality of reasons.

In some implementations of the methods and devices, the system includes a plurality of network appliances that are each configured to receive the upgrade strategy discovery request, and a report generator. The report generator can be configured to receive an upgrade planning data collection from the network appliances and the network appliance. The upgrade planning data collection can include the upgrade planning data. The report generator can be configured to use the upgrade planning data collection to produce an upgrade report, and the upgrade report can associate the network appliances with the plurality of upgrade types and a plurality of reasons. In some implementations of the methods and devices, the plurality of upgrade types includes a restart upgrade type, the upgrade is a restart upgrade when the upgrade type is the restart upgrade type, and the restart upgrade includes restarting the network appliance.

In some implementations of the methods and devices, a first one of the service executables has an execution state dependency that requires a second one of the service executables to enter one of the execution states before the first one of the service executables enters the one of the execution states, and the upgrade planning data indicates a plurality of execution state dependencies that include the execution state dependency. In some implementations of the methods and devices, the system includes an upgrade generator that is configured to use the upgrade planning data to produce the upgrade specification. In some implementations of the methods and devices, the network appliance includes the upgrade generator.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 5 is a diagram illustrating at least some of the upgrade states for the services along with the execution domain in which to execute the upgrade step according to some aspects.

FIG. 6 is a diagram illustrating at least some of the services that may be provided by a network appliance according to some aspects.

FIG. 7A, FIG. 7B, and FIG. 7C are diagrams illustrating an upgrade specification for a hitless upgrade according to some aspects.

FIG. 14 illustrates a high-level flow diagram of a method for dynamically creating upgrade specifications based on per device capabilities according to some aspects.

Throughout the description, similar reference numbers may be used to identify similar elements.

DETAILED DESCRIPTION

Figure 1:
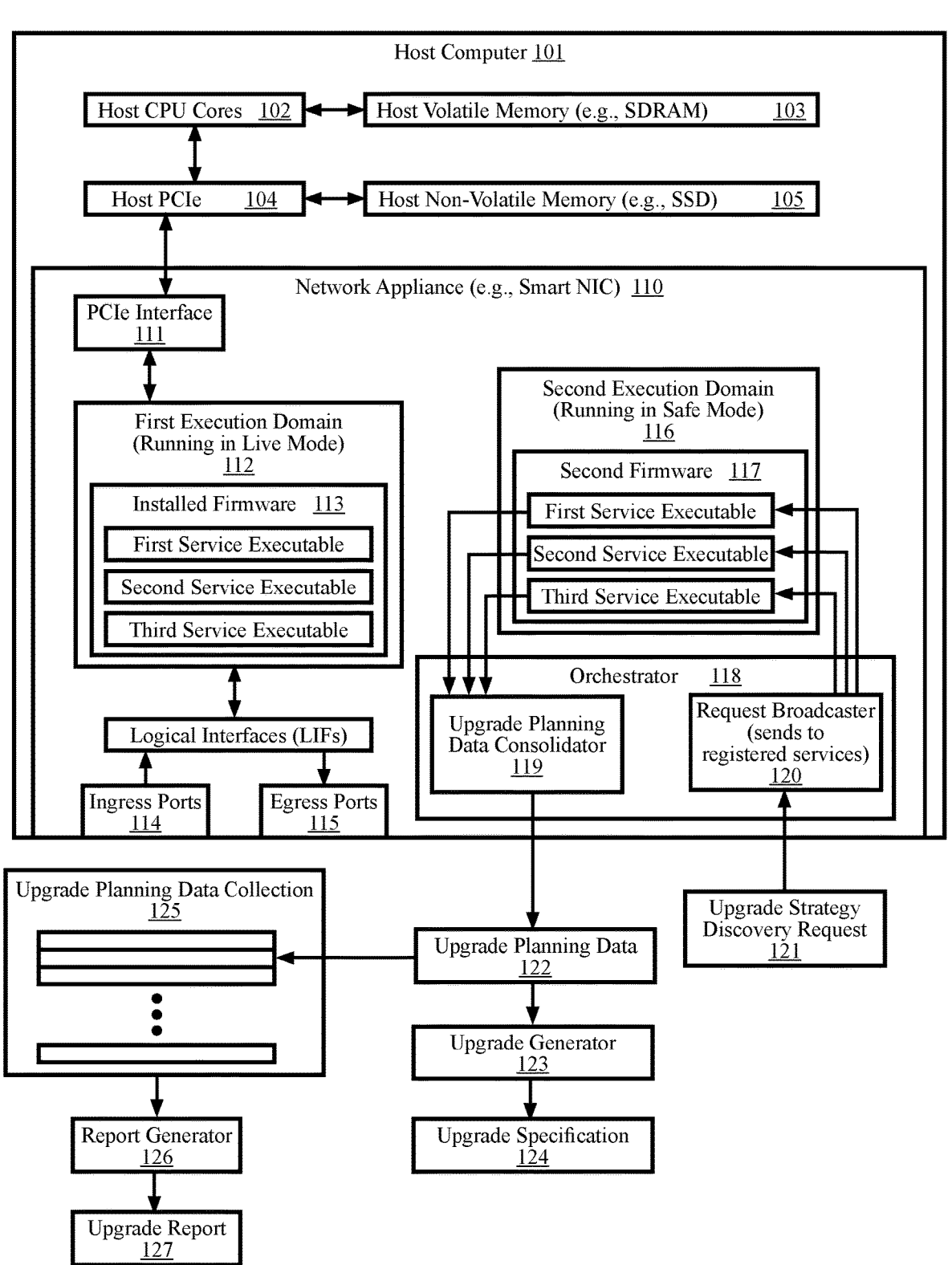
FIG. 1 is a high-level diagram illustrating a network appliance producing upgrade planning data for use in generating an upgrade specification and an upgrade report according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

A network appliance can run an installed firmware that includes service executables that perform various tasks that are required for the network appliance to perform its role in a network. For example, a service executable may be responsible for maintaining flow tables for those network flows, maintaining session tables for two or more cooperating network flows, configuring a packet processing pipeline circuit in the network appliance's data plane to process the network flows, etc. The network appliance can run the service executables in an execution domain. Computers and network appliances that are not running virtual machines or containers may be running all their processes in a single execution domain.

Networking equipment, such as the network appliance, must occasionally be upgraded from an installed firmware to a second firmware and it is desirable that the upgrades have as little impact on network communications as possible. Different types of upgrade cause different amounts of disruption. A hitless upgrade is an upgrade that can be accomplished without interrupting network communications. A graceful upgrade can affect network communications but does not take a network appliance out of service. A restart upgrade temporarily takes a network appliance out of service. It is therefore clear that a network operator prefers that as many upgrades as possible should be hitless, and should be graceful if they can't be hitless. The network operator, however, can have many thousands of network appliances that can have different amounts of memory, different numbers of central processor unit (CPU) cores, different packet processing pipeline circuits, etc. For example, some of the network appliances may be older models that have 128 gigabytes (GB) of synchronous dynamic random-access memory (SDRAM) and others may be newer models with 256 GB of SDRAM. All or most of the network appliances may be capable of running the second firmware. The different network appliances, even those of the same model, may require different upgrade implementations. The network operator has to manage upgrading the network appliances to the newest firmware while knowing which cannot be upgraded. Upgrading the network appliances in a large and complex network can be a logistical nightmare.

The logistics of upgrading the network appliances can be substantially automated. A network appliance can initiate a second execution domain, run the second firmware in the second execution domain, and use observations of the second firmware to produce upgrade planning data. The upgrade planning data can be used to determine how to implement an upgrade to the second firmware. An upgrade generator can produce an upgrade specification by interpreting the upgrade planning data. The upgrade specification can specify a finite state machine that implements the upgrade to the second firmware. As such, observations of the second firmware as it runs on the network appliance can result in implementing an upgrade that disrupts network communications as little as possible. In addition, the upgrades implemented by each of the network appliances can be specifically tailored specifically for each individual network appliance. The network operator's logistics nightmare is considerably reduced because the least disruptive upgrades may be automatically generated and implemented for thousands of network appliances. In addition, the upgrade planning data produced by the network appliances can be used to generate an upgrade report indicating which network appliances can implement hitless upgrades, which can implement graceful upgrades, and which can implement restart upgrades. The upgrade report may also indicate why a particular network appliance requires a restart upgrade or a graceful upgrade. For example, the upgrade report could indicate that a specific network appliance has too little SDRAM to implement a hitless upgrade, a situation curable by installing more SDRAM. The upgrade report may also indicate a hardware incompatibility, in which case the network appliance may be scheduled to be taken out of service.

There are many advantages to dynamically creating upgrade specifications based on per device capabilities. One advantage is that the network operator is relieved of the logistical nightmare of planning how to upgrade each network device. Another advantage is that network disruptions can be reduced, especially when administrative personnel select the wrong upgrade type or simply choose the upgrade type that will most likely work on everything. Another advantage is that upgrade reports can provide diagnostics of the upgrade process across the entire network and can indicate which hardware may need supplementation (e.g., install more SDRAM) or to be replaced.

FIG. 1 is a high-level diagram illustrating a network appliance 110 producing upgrade planning data 122 for use in generating an upgrade specification 124 and an upgrade report 127 according to some aspects. Here, the network appliance 110 is a smart network interface card (SmartNIC) that is installed in a host computer 101. The host computer 101 can run host side executables or workloads using host CPU cores 102, host volatile memory 103 such as SDRAM, host non-volatile memory 105 such as a solid-state disk (SSD), and a host peripheral component interconnect express (PCIe) interface 104. The network appliance 110 can have a PCIe interface 111 such that the host computer 101 and the network appliance 110 can communicate via a PCIe bus. The network appliance 110 can run an installed firmware 113 in a first execution domain 112. The installed firmware 113 includes a first service executable, a second service executable, and a third service executable. The first service executable is a service executable that provides a first service. The second service executable is a service executable that provides a second service. The third service executable is a service executable that provides a third service. There can be many other processes running in a firmware such as the installed firmware. The first service executable, the second service executable, and the third service executable can communicate with and manage the network appliance's packet processing circuits because the service executables in the first execution domain 112 are running in live mode. Service executables running in live mode are able to participate in providing network services by, for example, configuring the network appliance's data plane circuits, such as the packet processing pipeline circuits, to process new network traffic flows. As such, the installed firmware is providing network services by communicating with the PCI interface 111 and with logical interfaces that can receive network packets via ingress ports 114 and can send network packets via egress ports 115.

The network appliance 110 also has a second execution domain 116 and is running a second firmware 117 in the second execution domain 116. The second firmware also includes a first service executable, a second service executable, and a third service executable. The service executables in the second firmware 117 can be different versions of the service executables in the installed firmware 113. Processes running in different execution domains can be isolated from one another such that, for example, a data structure in the network appliance's memory is not concurrently read and written by the first service executable running in the first execution domain and by the first service executable running in the second execution domain. Furthermore, the service executables running in the second execution domain are running in safe mode. Service executables running in safe mode are unable to participate in providing network services. As such, the second firmware cannot provide network services while its service executables are running in safe mode. Service executables running in safe mode may be set to live mode and service executables in live mode may be set to safe mode. Those practiced in debugging network hardware are familiar with safe mode and live mode operation. The installed firmware and the second firmware are running in isolation from one another because one of them is running in safe mode and because neither can write into the same memory areas.

Many upgrade processes run service executables in two execution domains such that a failed upgrade attempt can be rolled back such that the network appliance returns to using the service executables in the first execution domain. A successful upgrade results in the first execution domain being halted because the service executables in the second execution domain switch to live mode and take over from those in the first execution domain. Both execution domains can exist and concurrently run firmware during an upgrade, thereby consuming more of the network appliance's resources than would be required when only one execution domain is running a firmware. During normal operation, the network appliance can run one version of firmware in a single execution domain. More of a network appliance's resources may be consumed during an upgrade than during normal operation because two firmware can be running in different execution domains. As such, an upgrade process can fail if the network appliance lacks the resources to run the installed firmware in the first execution domain while concurrently running the second firmware in the second execution domain.

The network appliance 110 can have an orchestrator 118 that helps orchestrate upgrades. The orchestrator can send or forward a request, such as an upgrade strategy discovery request 121, to the service executables. Each one of the service executables may respond to an upgrade strategy discovery request 121 with upgrade constraint data such as dependencies on other service executables. The orchestrator 118 can include an upgrade planning consolidator 119 that collects upgrade constraint data and produces upgrade planning data 122. An upgrade generator 123 can use the upgrade planning data 122 to produce an upgrade specification. The upgrade planning data 122 can also be included in an upgrade planning data collection 125. A report generator 126 can use the upgrade planning data collection 125 to produce an upgrade report 127.

Figure 2:
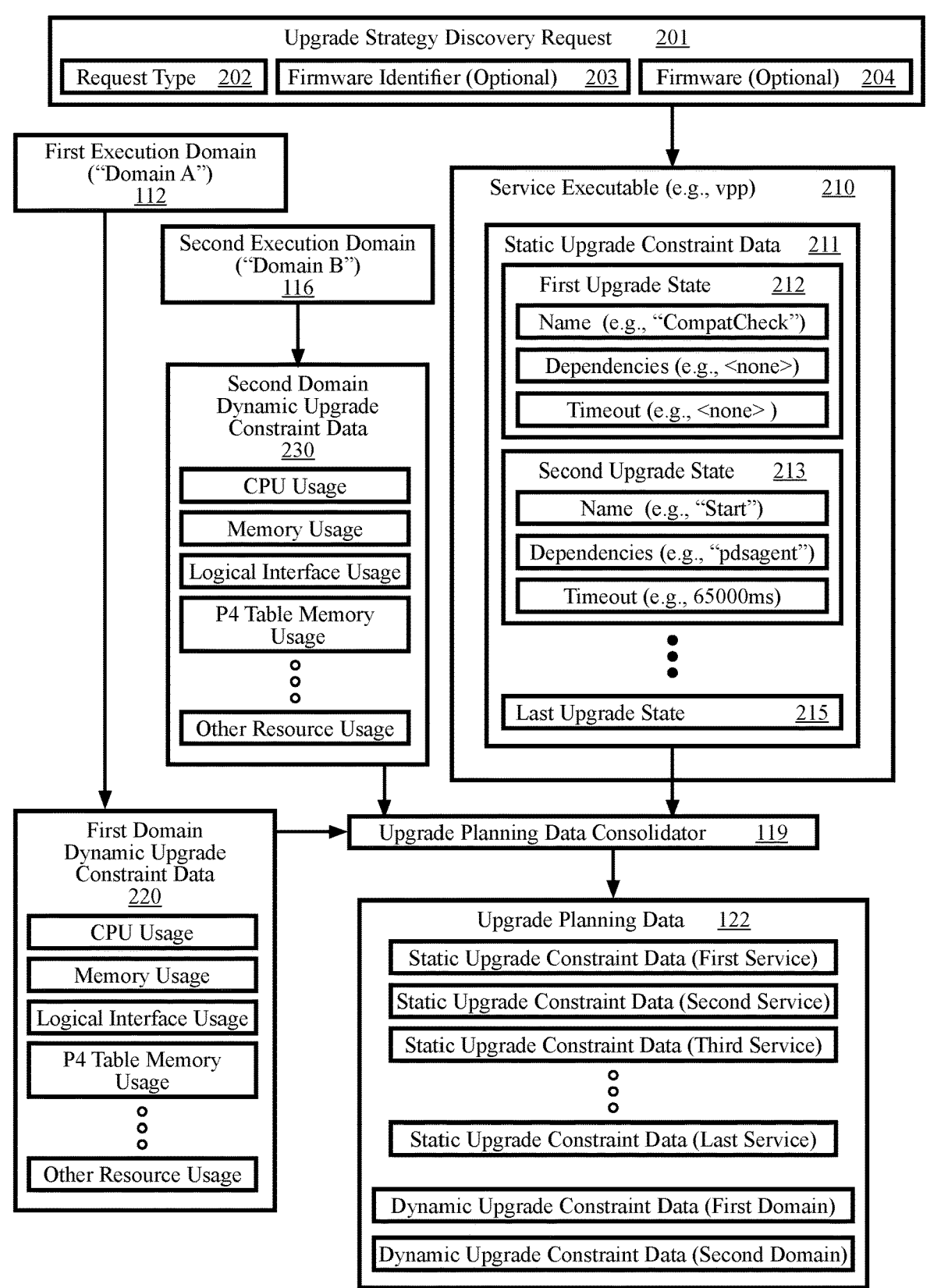
FIG. 2 is a high-level diagram illustrating static upgrade constraint data and dynamic upgrade constraint data produced in response to receiving an upgrade strategy discovery request according to some aspects.

FIG. 2 is a high-level diagram illustrating static upgrade constraint data 211 and dynamic upgrade constraint data 220, 230 produced in response to receiving an upgrade strategy discovery request 201 according to some aspects. The upgrade strategy discovery request 201 can include a request type 202, a firmware identifier 203, and firmware 204. The firmware identifier 203 and the firmware 204 may be optional. The firmware 204 can include service executables and the firmware identifier 203 (e.g., version number/indicator) can indicate the firmware's version. A service executable 210 that receives the upgrade strategy discovery request 201 can generate static upgrade constraint data 211. Static upgrade constraint data 211 can include information for a first upgrade state 212, a second upgrade state 213, a last upgrade state 215, and many other upgrade states. The information for each upgrade state can include a name/identifier that can identify the upgrade state, a timeout that can indicate a maximum amount of time that may be allowed for the service executable 210 to transition into the upgrade state, and dependencies on other service executables. For example, in the first upgrade state 212, identified as "CompatCheck", the service executable 210 can determine whether the network appliance's current hardware configuration is compatible or incompatible with the planned upgrade. In the second upgrade state 213, identified as "Start", the service executable in the first execution domain can stop or close external communications channels in preparation for a new version of the service executable to be brought up in the second execution domain. The service executable named "vpp" can be a service that installs network flows into the network appliance's packet processing pipeline circuit. The service executable named "pdsagent" can receive data plane configuration data and can program data plane hardware. The second upgrade state 213 dependency indicates that "vpp" should wait for "pdsagent" to enter the "Start" state before "vpp" attempts to enter the "Start" state, but should wait for no more than 65 seconds. The static upgrade constraint data 211 can be stored in or in association with the service executable by a person who programs the service executable. As such, the network operator has no need to know of the dependencies, timeouts, upgrade states, etc. The static upgrade constraint data for the service executables can be included in the upgrade planning data 122.

The upgrade planning data 122 can also include dynamic upgrade constraint data. The dynamic upgrade constraint data can include first domain dynamic upgrade constraint data 220 and second dynamic upgrade constraint data 230. The dynamic constraint upgrade data can include values for dynamic parameters such as CPU usage, memory usage, logical interface usage, P4 table memory usage, and other resource usage by a firmware running in an execution domain. The dynamic upgrade constraint data can indicate whether the network appliance is capable of running the installed firmware in the first execution domain while concurrently running the second firmware in the second execution domain.

Figure 3:
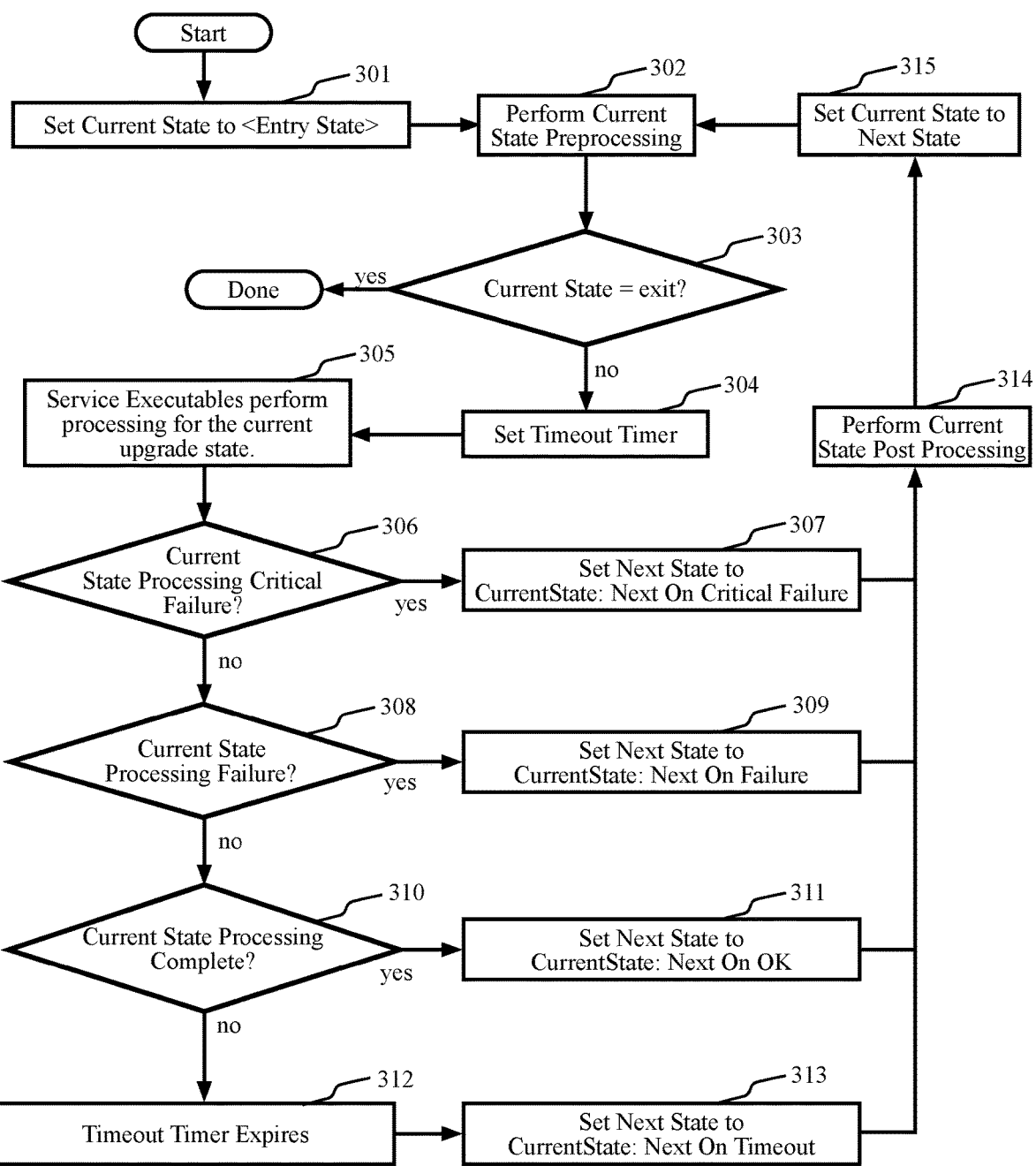
FIG. 3 is a high-level flow diagram illustrating a finite state machine for moving the service executables among the execution states according to some aspects.

FIG. 3 is a high-level flow diagram illustrating a finite state machine (FSM) for moving the service executables among the execution states according to some aspects. After the start, at block 310 the FSM current state is set to an entry state. At block 302, preprocessing for the current state is performed before the FSM moves to decision block 303. At decision block 303, the FSM determines whether the current state is the exit state. If the current state is the exit state, the FSM is done. If the current state is not the exit state, at block 304 a timeout timer is set. At block 305, the service executables can perform processing for the current upgrade state. Decision block 306 determines whether the processing at block 305 resulted in a critical failure (e.g., a process crashed, exited with error code indicating critical failure, etc.). If there was a critical failure, then at block 307 the next state can be set to the state indicated as the next state to enter upon critical failure. At block 314, post processing for the current state is performed. At block 315, the current state is set to the next state before the FSM moves back to block 302. If at block 306 there was no critical failure, the FSM moves to decision block 308 and determines whether the processing at block 305 resulted in a failure (e.g., a process exited with error code indicating failure, etc.). If there was a failure, then at block 309 the next state can be set to the state indicated as the next state to enter upon failure, then the FSM moves to block 314. If at block 308 there was no failure, the FSM moves to decision block 310 and determines whether the processing at block 305 completed normally (e.g., process exited without an error code indicating failure or critical failure, etc.). If the processing at block 305 completed normally, then at block 311 the next state can be set to the state indicated as the next state to enter upon normal completion, then the FSM moves to block 314. If at block 310 the processing at block 305 has not completed and the timeout time expires at block 312, then at block 313 the next state can be set to the state indicated as the next state to enter upon timeout, then the FSM moves to block 314.

Stage failures have occurred when the process of FIG. 3 enters block 307, block 309, or block 313. For example, during the "compatibility check" upgrade state the processing at block 305 can determine if the network appliance's hardware is compatible with the second firmware and if the network appliance has sufficient resources to perform the upgrade. An example of incompatible hardware is a logical interface (LIF) that is incompatible with the second firmware. Configuring a logical interface to be compatible with the second firmware may require halting the logical interface, in which case a graceful upgrade type is indicated. Configuring a logical interface to be compatible with the second firmware may require restarting the network appliance, in which case a restart upgrade type is indicated. Examples of insufficient resources include insufficient SDRAM to run two execution domains, insufficient pipeline table memory to concurrently hold two versions of one or more tables, etc.

Figure 4:
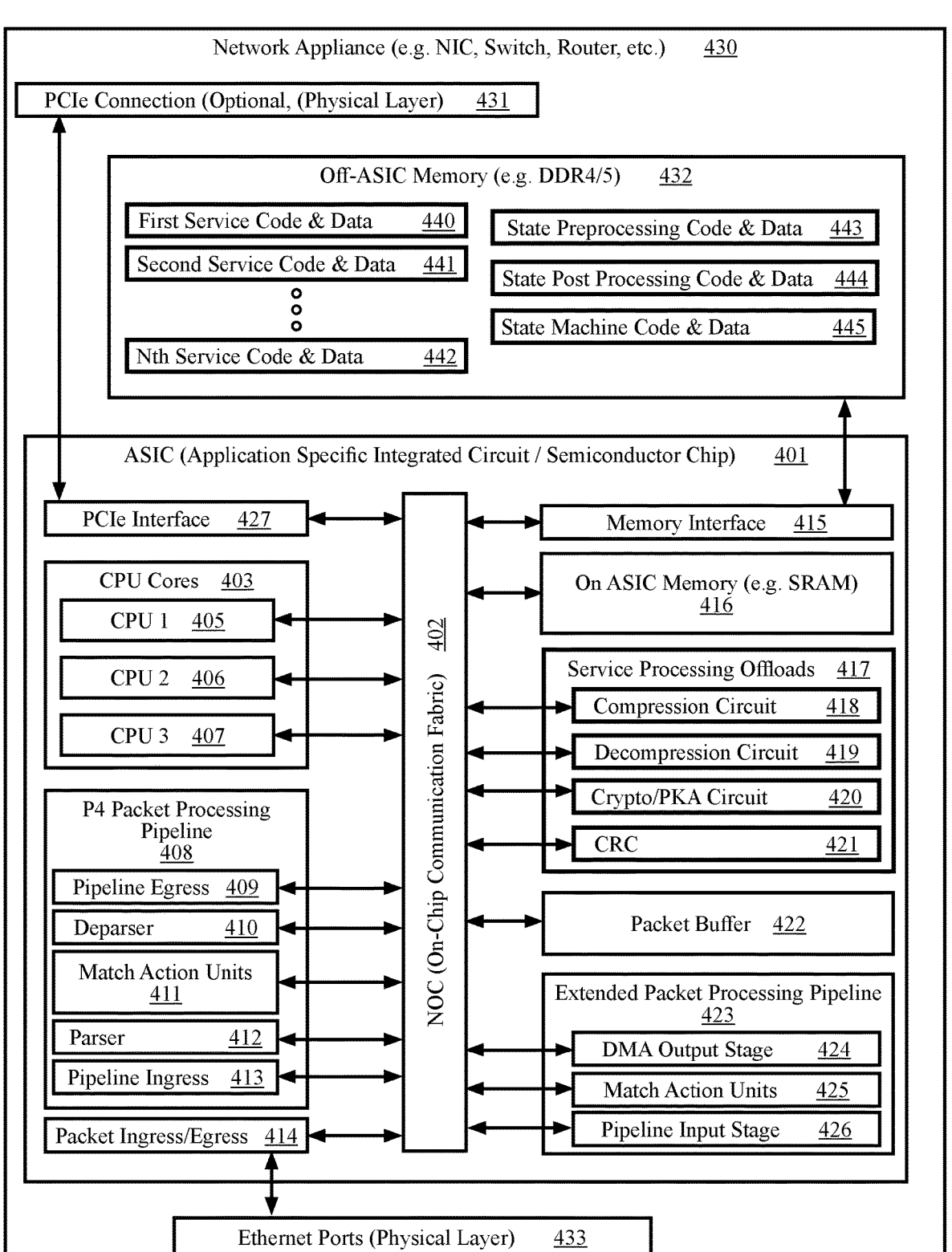
FIG. 4 is a functional block diagram of a network appliance such as a network interface card (NIC) or a network switch having an application specific integrated circuit (ASIC), according to some aspects.

FIG. 4 is a functional block diagram of a network appliance 430 such as a network interface card (NIC) or a network switch having an application specific integrated circuit (ASIC) 401, according to some aspects. A network appliance that is a NIC includes a peripheral component interconnect express (PCIe) connection 431 and can be installed in a host computer. A NIC can provide network services to the host computer and to virtual machines (VMs) running on the host computer. The network appliance 430 includes an off-ASIC memory 432, and ethernet ports 433. The off-ASIC memory 432 can be one of the widely available memory modules or chips such as double data rate version 4 (DDR4) synchronous dynamic random-access memory (SDRAM) modules such that the ASIC has access to many gigabytes of memory. The ethernet ports 433 provide physical connectivity to a computer network such as the internet.

The ASIC 401 is a semiconductor chip having many core circuits interconnected by an on-chip communications fabric, sometimes called a network on a chip (NOC) 402. The NOC can be an implementation of a standardized communications fabric such as the widely used advanced extensible interface (AXI) bus. The ASIC's core circuits can include a PCIe interface 427, central processing unit (CPU) cores 403, P4 packet processing pipeline 408 elements, memory interface 415, on ASIC memory (e.g., SRAM) 416, service processing offloads 417, a packet buffer 422, extended packet processing pipeline 423, and packet ingress/egress circuits 414. A PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that its designers have chosen to provide hardware for offloading those functions from the CPUs. The service processing offloads can include a compression circuit 418, decompression circuit 419, a crypto and public key authentication (PKA) circuit 420, and a cyclic redundancy check (CRC) calculation circuit 421. The specific core circuits implemented within the nonlimiting example of ASIC 401 have been selected such that the ASIC implements many, perhaps all, of the functionality of an InfiniBand channel adapter, of an NVMe card, and of a network appliance that processes network traffic flows carried by internet protocol (IP) packets.

The P4 packet processing pipeline 408 is a specialized set of elements for processing network packets such as IP packets, NVMe protocol data units (PDUs), and InfiniBand PDUs. The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is defined in the "$P4_{16}$ Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including network switches, network routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system. The memory 432 can also be used to store first service code and data 440, second service code and data 441, Nth service code and data 442, state preprocessing code and data 443, state post processing code and data 444, and state machine code and data 445. Service code and data can be the executable code, data, and data structures that a service executable uses to provide a service. State preprocessing code and data 443 can be the executable code, data, and data structures that an FSM may execute before transitioning a service executable from one state to another state. State post processing code and data 444 can be the executable code, data, and data structures that an FSM may execute after transitioning a service executable from one state to another state. State machine code and data 445 can be the executable code, data, and data structures that implement the FSM.

The CPU cores 403 can be general purpose processor cores, such as reduced instruction set computing (RISC) processor cores, advanced RISC machine (ARM) processor cores, microprocessor without interlocked pipelined stages (MIPS) processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408, 423.

The packet processing circuitry 408, 423 can be a specialized circuit or part of a specialized circuit implementing programmable packet processing pipelines. Some embodiments include a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path.

The ASIC 401 is illustrated with a P4 packet processing pipeline 408 and an extended packet processing pipeline 423. The extended packet processing pipeline is a packet processing pipeline that has a direct memory access (DMA) output stage 424. The extended packet processing pipeline 424 has match-action units 425 that can be arranged as a match-action pipeline. The extended packet processing pipeline has a pipeline input stage 426 that can receive packet header vectors (PHVs) or directives to perform operations. A PHV can contain data parsed from the header and body of a network packet by the parser 412.

All memory transactions in the NIC 430, including host memory transactions, on board memory transactions, and register reads/writes may be performed via a coherent interconnect 402. In one nonlimiting example, the coherent interconnect can be provided by a network on a chip (NOC) "IP core" (in this one context, "IP" is an acronym for intellectual property). Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 423, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

FIG. 5 is a diagram illustrating at least some of the upgrade states for the services along with the execution domain in which to execute the upgrade step according to some aspects. An enumeration, name and domain table 500 lists upgrade states and the execution domain in which the processing for the upgrade state is performed. The first execution domain, where the installed firmware runs, is called "Domain A". The second execution domain, where the second firmware runs, is called "Domain B". The upgrade step enumeration enumerates the steps such that they can be consistently referred to as "first", "second", and so forth. The upgrade state name provides a name for each state that is indicative of the processing occurring at that state.

The first upgrade state is named "CompatCheck" (short for compatibility check) and is performed in Domain A. The compatibility check can determine whether the network appliance has sufficient resources for performing the update, has compatible hardware, etc. For example, the compatibility check may indicate that the network appliance has insufficient memory (e.g., not enough SDRAM) for performing the upgrade.

The second upgrade state is named "Start" and is performed in Domain A. In "Start" a Domain A service executable can stop external communications channels and prepare for a corresponding service executable (e.g., another version of the service executable) to be instantiated in Domain B.

The third upgrade state is named "Back Up" and is performed in Domain A. In "Back Up" a Domain A service executable can produce a backup of its state data and other data that may be needed by the corresponding executable. For example, when the service executable is the first service executable in the first execution domain then the corresponding executable can be the first service executable in the second execution domain.

The fourth upgrade state is named "Prepare" and is performed in Domain A. In "Prepare" the corresponding executable can be instantiated in Domain B and backed up data restored in Domain B for later use by the corresponding executable. This step may include translating data structures to new versions, etc.

The fifth upgrade state is named "Ready" and is performed in Domain B. In "Ready" the newly instantiated corresponding executable becomes ready to provide services.

The sixth upgrade state is named "Configuration Replay" and is performed in Domain B. In "Configuration Replay", configuration data may be fed into the corresponding executables in order to synchronize configuration with the service executables.

The seventh upgrade state is named "Synchronize" and is performed in Domain B. In "Synchronize", the operational states of the corresponding executables can be synchronized by, for example, restoring from the backup that was prepared earlier.

The eighth upgrade state is named "Pre-Switchover" and is performed in Domain A. In "Pre-Switchover", the service executables may finish processing network packets that are already being processed and otherwise completing other work-in-progress.

The ninth upgrade state is named "Switchover" and is performed in Domain B. In "Switchover" the corresponding executables begin providing network services and otherwise take over from the new quiesced service executables.

The tenth upgrade state is named "Roll Back" and is performed in Domain B. In "Roll Back", tasks are executed because "Switchover" has failed and the upgrade has failed. The corresponding executables must be quiesced and halted such that the service executables can resume providing network services.

The 11th upgrade state is named "Repeal" and is performed in Domain A. In "Repeal", the service executables resume providing network services and Domain B may be halted.

The 12th upgrade state is named "Finish" and is performed in Domain A. In "Finish" the upgrade is almost complete and successful, Domain A may be halted. At this point, the corresponding executables in Domain B become the service executables and Domain B becomes the first execution domain.

The 13th upgrade state is named "exit". The FSM stops running.

FIG. 6 is a diagram illustrating at least some of the services that may be provided by a network appliance according to some aspects. A service enumeration table 600 provides a non-limiting list of the service executables. The first service may be provided by a service executable named "sysmgr". Sysmgr is a well-known service manager used in many Linux distributions. The second service may be provided by a service executable named "pciemgr". Pciemgr can manage aspects of configuring and managing the PCIe interface. For example, it can write and rewrite the entry points through which the host computer accesses services provided by the SmartNIC. Such entry points may change during an upgrade when a service executable is replaced by a corresponding executable. The third service may be provided by a service executable named "pdsagent". Pdsagent may be a google remote procedure call (gRPC) agent, may receive data plane configuration data, and may program data plane hardware. The fourth service may be provided by a service executable named "vpp". Vpp may be a service that installs network flows into the network appliance's packet processing pipeline circuit. The fifth service may be provided by a service executable named "operd". Operd may be a service executable for an in-memory key-value store in general where, for example, a service module id or other value may be the key or part of the key. Individual services may use operd to store their internal operational data, log messages, etc.

FIG. 7A, FIG. 7B, and FIG. 7C are diagrams illustrating an upgrade specification 701 for a hitless upgrade according to some aspects. The hitless upgrade is a hitless upgrade type of upgrade because the upgrade can be accomplished without interrupting network communications. The FSM of FIG. 3 can use the upgrade specification 701 to upgrade a network appliance. The upgrade specification 701 can include a service list 702, default values 703, and upgrade state specifications. The service list 702 can indicate the service executables that are affected by an upgrade. When an upgrade state specification does not provide a value, one of the default values 703 may be used by the FSM. Each upgrade state specification is for a specific upgrade state (e.g., "CompatCheck", "Start", etc.) and includes parameters that are to be used by the FSM for moving itself and the service executables into and out of that specific state.

The first upgrade state specification 704 is for the "CompatCheck" state. As such, the first upgrade state specification 704 provides the following values:

CompatCheck: Next On OK=Start;
CompatCheck: Next On Failure=exit;
CompatCheck: Next On Critical Failure="exit"; and
CompatCheck: Next On Timeout=exit.

Referring to FIG. 3, block 307 recites "Set Next State to CurrentState: Next On Critical Failure". As such, if any of the service executables return a critical failure at FIG. 3, block 305 when the FSM is in the CompatCheck state, then at block 307 Next State is set to "exit".

Referring to FIG. 3, block 309 recites "Set Next State to CurrentState: Next On Failure". As such, if any of the service executables return a failure at FIG. 3, block 305 when the FSM is in the CompatCheck state, then at block 309 Next State is set to "exit".

Referring to FIG. 3, block 311 recites "Set Next State to CurrentState: Next On OK". As such, if all of the service executables complete without error at FIG. 3, block 305 when the FSM is in the CompatCheck state, then at block 311 Next State is set to "Start".

Referring to FIG. 3, block 313 recites "Set Next State to CurrentState: Next On Timeout". As such, if any of the service executables timeout at FIG. 3, block 312 when the FSM is in the CompatCheck state, then at block 313 Next State is set to "exit".

The first upgrade state specification 704 provides no "Sequence" value, as such the default value "Parallel" is used. As such, the FSM allows all the service executables to perform their "CompatCheck" processing at block 305 concurrently. The first upgrade state specification 704 provides no "Timeout" value, as such the default value "60000 ms" is used and all the processes must complete their "CompatCheck" processing at block 305 within 60 seconds. The first upgrade state specification 704 provides no "Discovery Flag" value, as such the default value "false" is used. The discovery flag indicates that services should be able to respond to broadcasted service discovery notifications. In discovery notification, the response may contain service metadata along with service communication endpoint id. Endpoint id or IPC id helps orchestrator/upgrade-manager to directly talk to service in future, meta information helps to come up with strategies on the fly. The first upgrade state specification 704 provides no "Execution Domain" value, as such the default value "null" is used and the CompatCheck processing at block 305 is performed in Domain A. The first upgrade state specification 704 provides no "State Preprocessing Indicator" value, as such the default value "null" is used and at block 314 there is no processing performed for CompatCheck. The first upgrade state specification 704 provides no "State Post Processing Indicator" value, as such the default value "null" is used and at block 302 there is no processing performed for CompatCheck.

The second upgrade state specification 705 provides values that the FSM of FIG. 3 can use for the "Start" upgrade state. The FSM uses the values in the second upgrade state specification 705 substantially the same as it does the values in the first upgrade state specification 704. The second upgrade state specification 705 provides the following values that the FSM uses for determining the next state:

Start: Next On OK=Back Up;
Start: Next On Failure=Repeal;
Start: Next On Critical Failure="exit"; and
Start: Next On Timeout=Repeal.

The second upgrade state specification 705 provides the "State Preprocessing Indicator" value "hitless.sh". As such, at block 302 the FSM executes the program "hitless.sh". "hitless.sh" may use input values (e.g., command line arguments, environment variables, etc.) that are set or provided by the FSM or provided in some other manner. The second upgrade state specification 705 provides the "Sequence" value "Serial" and the "Service Order" value "pdsagent, vpp, operd". "Sequence=Serial" indicates execution state dependencies among the service executables. An execution state dependency occurs when the block 305 processing of at least one of service executables must be complete before the block 305 processing of another service executable is started. The service order indicates the order in which block 305 processing must be performed. Block 305 processing is the processing performed at block 305 of FIG. 3. As such, the block 305 processing for pdsagent must complete before block 305 processing for vpp is started and block 305 processing for vpp must complete before the block 305 processing for operd is started.

The third upgrade state specification 706 provides values that the FSM of FIG. 3 can use for the "Back Up" upgrade state. The FSM uses the values in the third upgrade state specification 706 substantially the same as it does the values in the first upgrade state specification 704 and the second upgrade state specification 705. The third upgrade state specification 706 provides the "State Post Processing Indicator" value "hitless.sh". As such, at block 314 the FSM executes the program "hitless.sh". "hitless.sh" may use input values (e.g., command line arguments, environment variables, etc.) that are set or provided by the FSM or provided in some other manner.

Those practiced in the art of FSMs now understand how the FSM of FIG. 3 uses the information in the upgrade specification 701 shown in FIGS. 7A, 7B, and 7C to upgrade a network appliance. As such, the remaining upgrade state specifications 707, 708. 709, 710, 711, 712, 712, 714, 715, and 716 are not discussed here in further detail.

Figure 8:
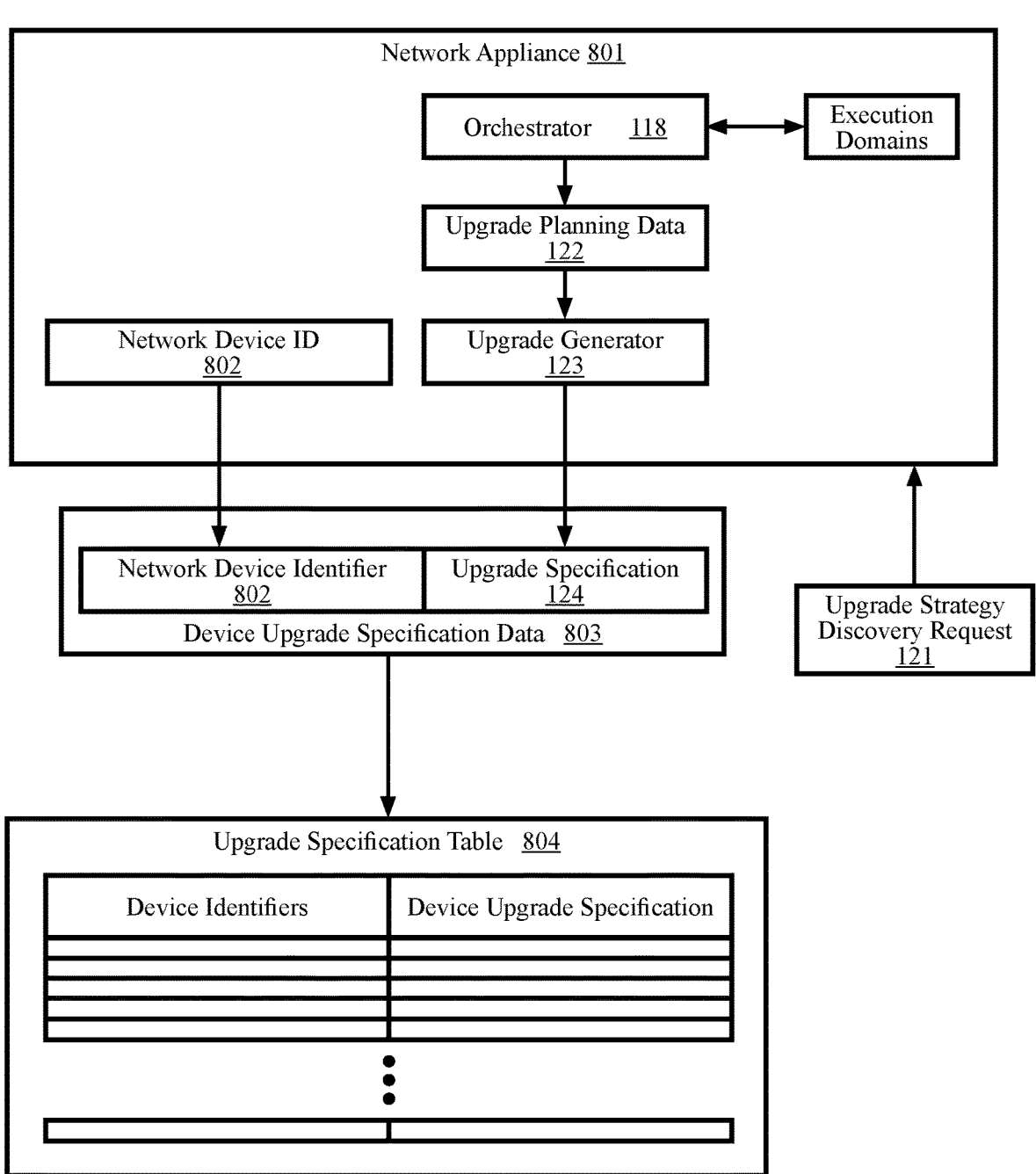
FIG. 8 is a high-level diagram illustrating a network appliance generating an upgrade specification according to some aspects.

FIG. 8 is a high-level diagram illustrating a network appliance 801 generating an upgrade specification 124 according to some aspects. As discussed above, an orchestrator 118 can use information obtained from the execution domains to produce upgrade planning data 122. An upgrade generator 123 can use the upgrade planning data to produce an upgrade specification 124. The network appliance can be uniquely identified by a network device ID 802. As such, the network device ID 802 and the upgrade specification 124 can be associated with one another. Device upgrade specification data 803 can include the network device ID 802 and the upgrade specification 124. The device upgrade specification data 803 can be included in a device upgrade specification table 804 that includes device upgrade specification data 803 for numerous network devices. The upgrade specifications may be provided to the network appliances such that the network appliances upgrade themselves. Network operators often prefer to upgrade equipment during off hours, according to a schedule, etc. By gathering the upgrade specifications, the network operator has an opportunity to analyze the upgrade specifications before using them. For example, the network operator may have hitless upgrades performed immediately and may schedule the performance of other upgrade types.

Figure 9:
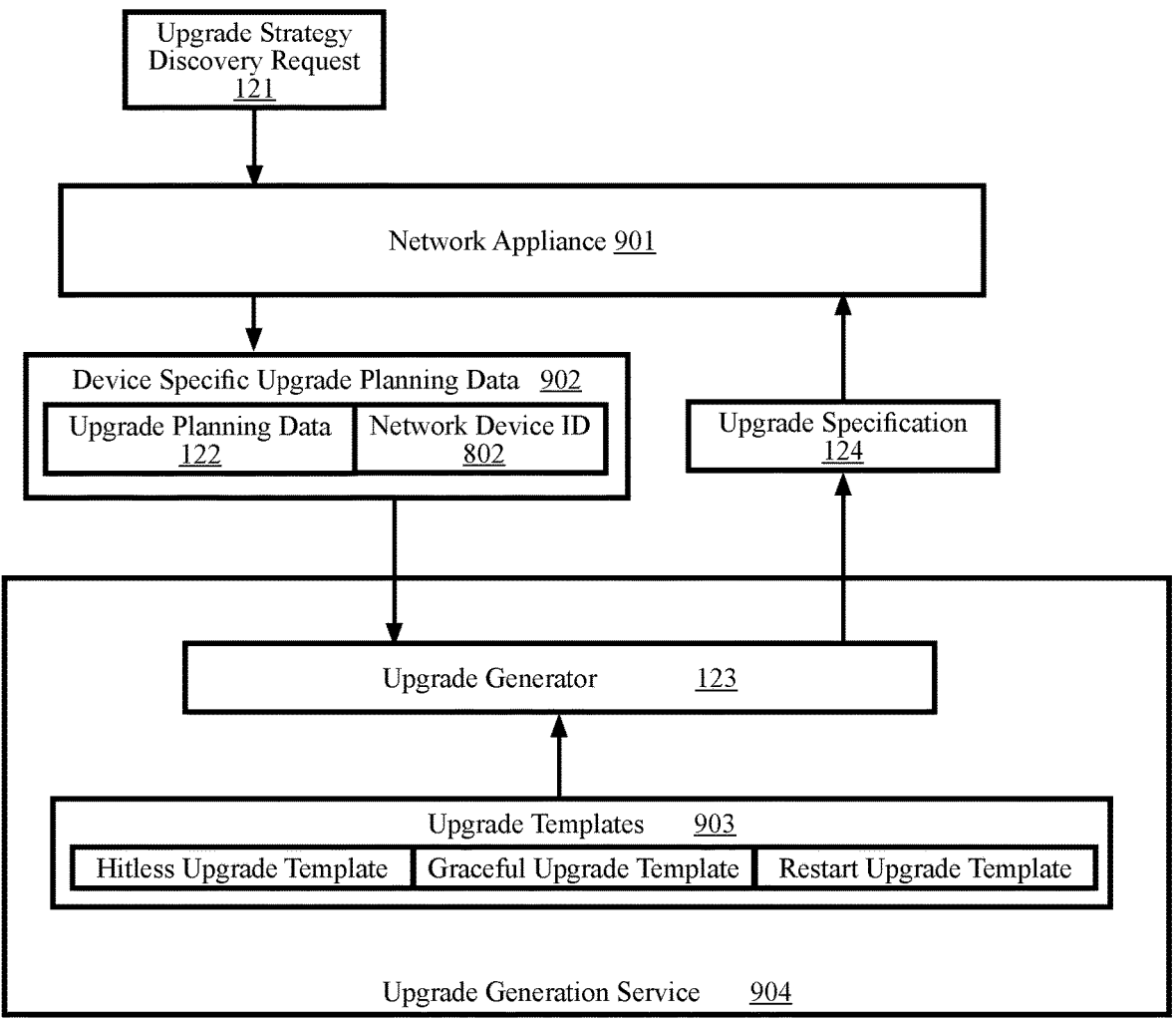
FIG. 9 is a high-level diagram illustrating an upgrade generator in an upgrade generator service using upgrade templates to generate an upgrade specification for a network appliance according to some aspects.

FIG. 9 is a high-level diagram illustrating an upgrade generator 123 in an upgrade generator service 904 using upgrade templates 903 to generate an upgrade specification 124 for a network appliance 901 according to some aspects. The network appliance has produced upgrade planning data 122 that may be used for specifying its own upgrade. The network appliance 901 can produce device specific upgrade planning data 902 that includes the upgrade planning data 122 and the network device ID 802. The device specific upgrade planning data 902 can be sent to the upgrade generation service 904. An upgrade generator 123 in the upgrade generation service 904 can use the device specific upgrade planning data 902 to produce an upgrade specification for the network appliance 901. The upgrade generator 123 can have upgrade templates 903 such as a hitless upgrade template, a graceful upgrade template, and a restart upgrade template. The upgrade planning data can be analyzed to determine which upgrade template to use to thereby produce a hitless upgrade specification, a graceful upgrade specification, or a restart upgrade specification. A hitless upgrade specification can be produced when the dynamic upgrade constraint data indicates that the network appliance can: concurrently run the installed firmware and the second firmware; and the data plane has sufficient table memory to hold two versions of tables that are being upgraded. An upgrade specification can be produced using an upgrade template by filling in fields of the upgrade template with information from the upgrade planning data. For example, the upgrade planning data can include dependencies provided by the service executables. The dependencies from the service executables can be used to produce the service orders for each upgrade state that are written into service order fields in the template.

A graceful upgrade specification can be produced when the dynamic upgrade constraint data indicates that the network appliance does not have sufficient table memory to hold two versions of tables that are being upgraded such that there is insufficient memory for a packet processing pipeline table duplication operation. As such, the upgrade specification may include upgrade states wherein the data plane is quiesced and the new versions of the tables written into the table memory. A restart upgrade specification can be produced when the dynamic upgrade constraint data indicates that the network appliance cannot concurrently run the installed firmware and the second firmware.

Figure 10:
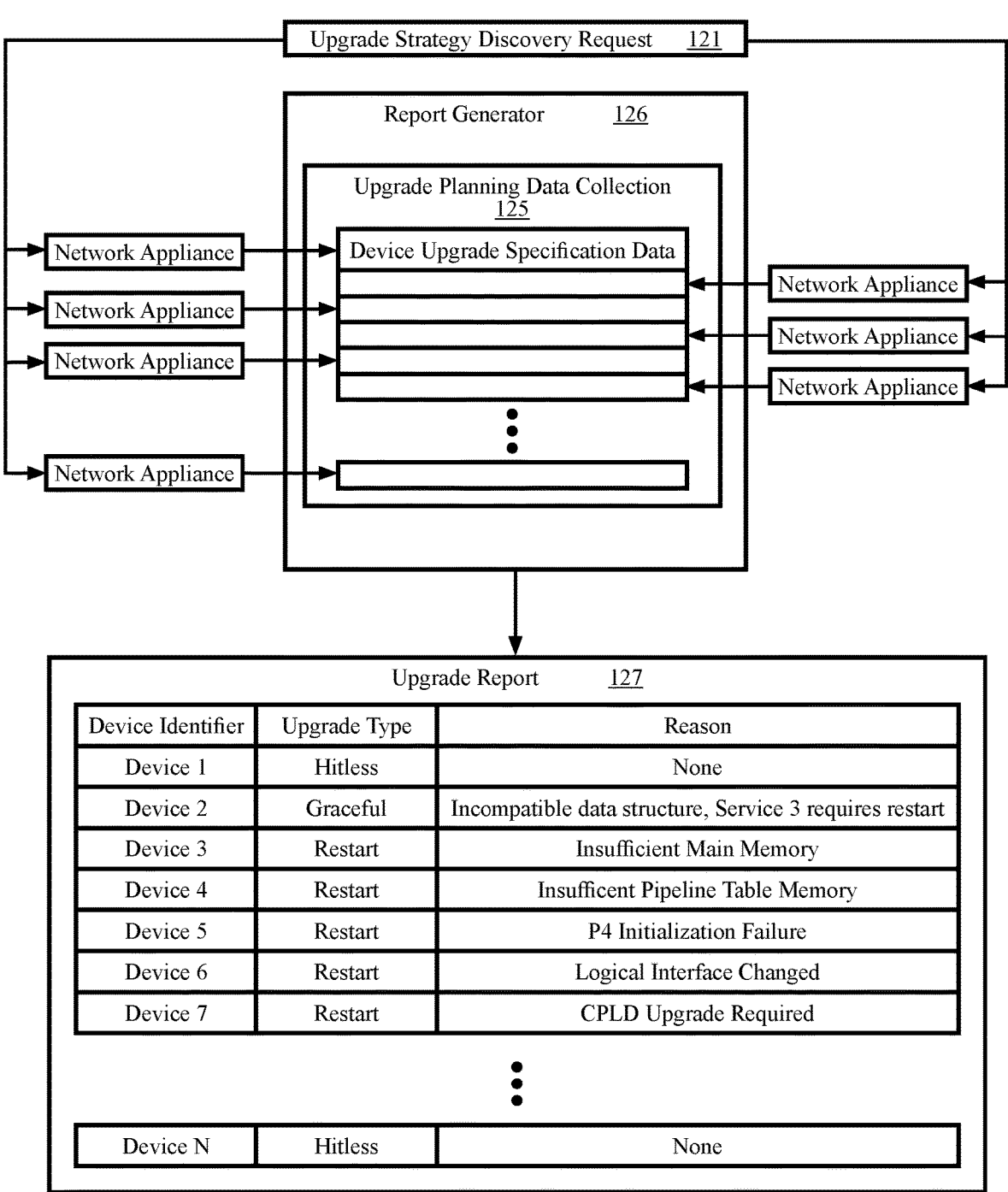
FIG. 10 is a high-level diagram illustrating a report generator receiving an upgrade planning data collection from a group of network appliances and producing an upgrade report according to some aspects.

FIG. 10 is a high-level diagram illustrating a report generator 126 receiving an upgrade planning data collection 125 from a group of network appliances and producing an upgrade report 127 according to some aspects. In FIG. 8, a network appliance 801 produces device upgrade specification data 803. In FIG. 10, the report generator 126 obtains the upgrade planning data collection 125 by gathering the device upgrade specification data from numerous network appliances. The report generator can use the upgrade planning data collection 125 to produce an upgrade report 127.

The upgrade report can indicate the type of upgrade for each of the network appliances and the reason for that particular type of upgrade. Here, the upgrade generators used by the network appliances may supplement the upgrade specification with data indicating the reason for that particular type of upgrade. For a hitless upgrade, no reason is necessary. The network operator can use the upgrade report 127 to plan physical upgrades (e.g., adding SDRAM) or replacing network appliances with newer models.

Figure 11:
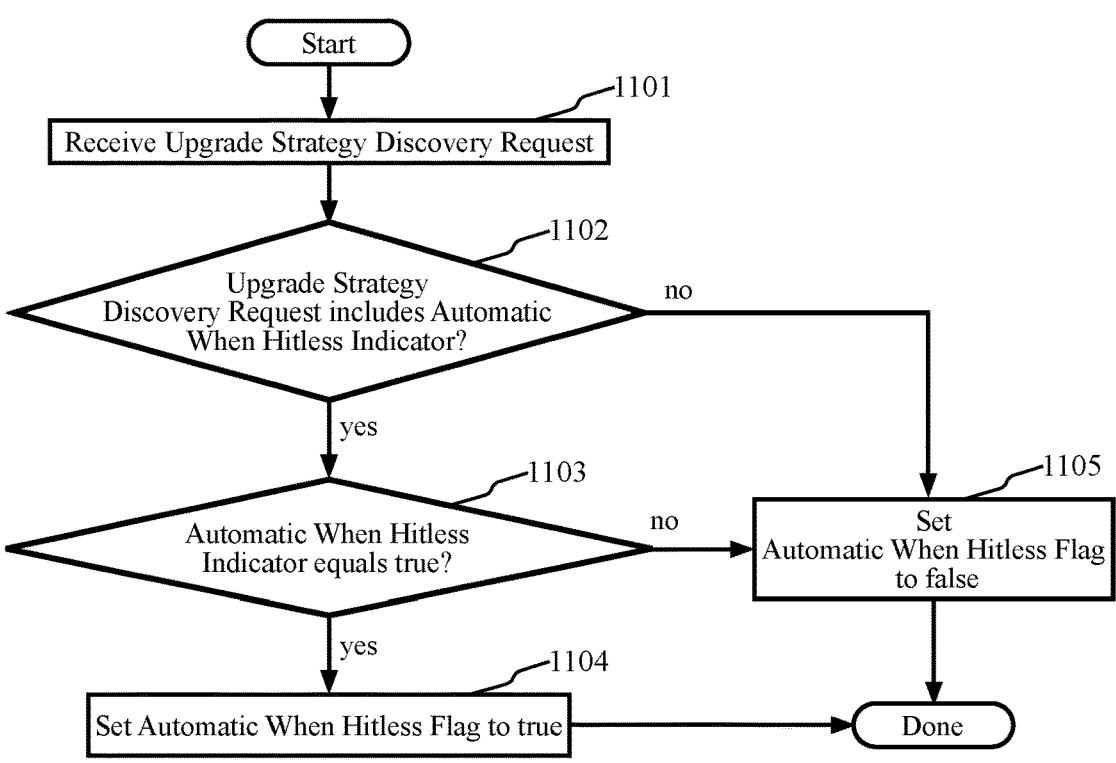
FIG. 11 is a high-level flow diagram illustrating a conditional automatic upgrade indicator being set because the upgrade strategy discovery request indicates automatically performing a hitless upgrade according to some aspects.

FIG. 11 is a high-level flow diagram illustrating a conditional automatic upgrade indicator being set because the upgrade strategy discovery request indicates automatically performing a hitless upgrade according to some aspects. The process can be implemented by a network appliance. After the start, at block 1101 the process receives an upgrade strategy discovery request. At decision block 1102, the process determines whether the upgrade strategy discovery request includes an automatic when hitless indicator. The automatic when hitless indicator can be a flag, Boolean value, or some other indicator in the upgrade strategy discovery request. If the upgrade strategy discovery request does not include an automatic when hitless indicator, then at block 1105 the automatic when hitless flag can be set to false before the process is done. If the upgrade strategy discovery request includes an automatic when hitless indicator, the process can move to decision block 1103. At decision block 1103, the process determines whether the automatic when hitless indicator equals true. If the automatic when hitless indicator equals true then at block 1104 the automatic when hitless flag is set to true before the process is done. Otherwise, the process moves to block 1105.

Figure 12:
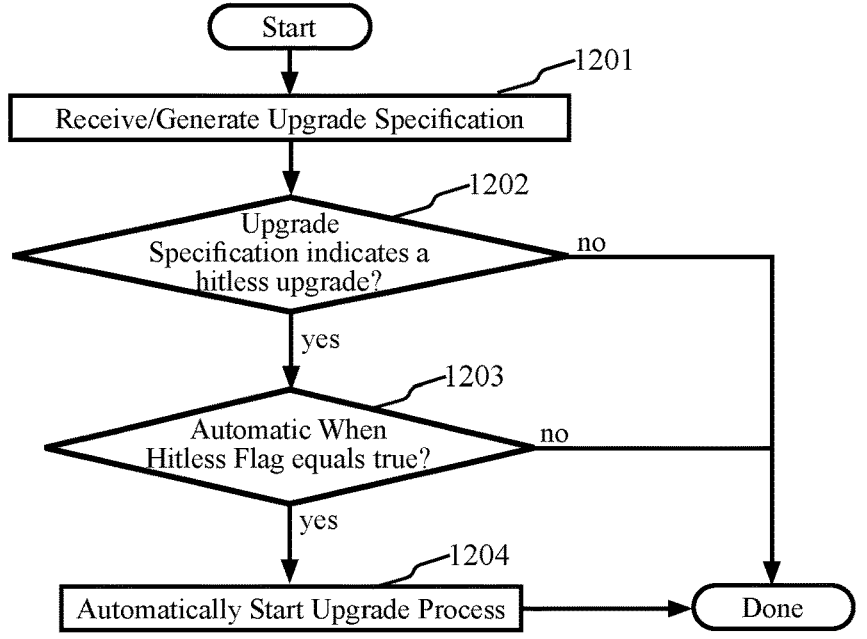
FIG. 12 is a high-level flow diagram illustrating automatically upgrading to the second firmware because the upgrade specification specifies a hitless upgrade according to some aspects.

FIG. 12 is a high-level flow diagram illustrating automatically upgrading to the second firmware because the upgrade specification specifies a hitless upgrade according to some aspects. The process illustrated in FIG. 12 can be implemented by a network appliance. After the start, at block 1201 the process can receive or generate an upgrade specification. At decision block 1202, the process can determine if the upgrade specification indicates a hitless upgrade. If a hitless upgrade is not indicated, the process is done. Otherwise, at decision block 1203 the process can determine if the automatic when hitless flag equals true. The automatic when hitless flag can be set by a process such as that shown in FIG. 11. If the automatic when hitless flag is not true, the process is done. Otherwise, at block 1204 the upgrade process is automatically started.

Figure 13:
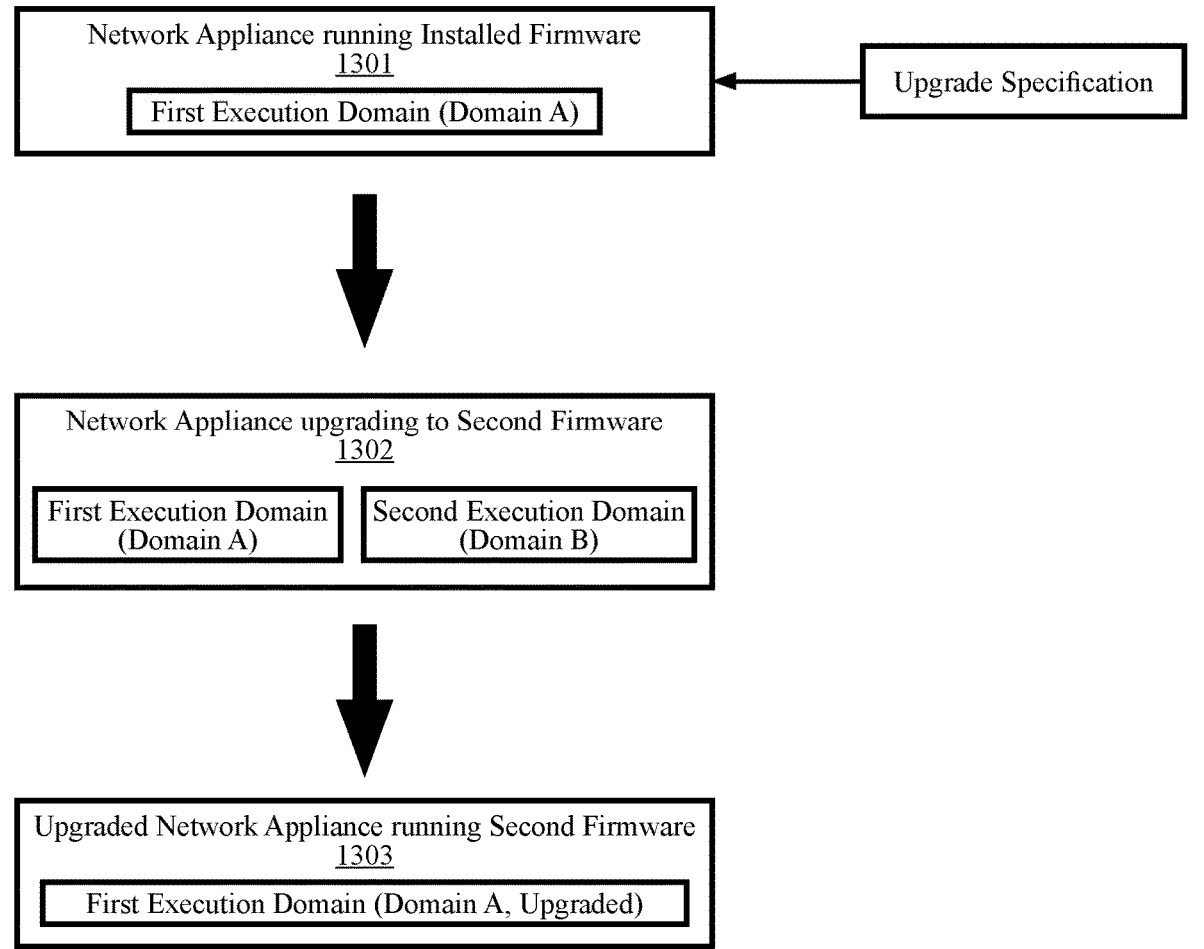
FIG. 13 is a diagram illustrating a network appliance upgrading to a second firmware in accordance with a network specification.

FIG. 13 is a diagram illustrating a network appliance upgrading to a second firmware in accordance with a network specification. Initially, the network appliance is a network appliance running installed firmware 1301 that receives an upgrade specification. In response to receiving the upgrade specification, the network appliance becomes a network appliance upgrading to a second firmware 1302. As such, the network appliance is concurrently running the installed firmware in Domain A, the second firmware in Domain B, and an FSM such as the FSM illustrated in FIG. 3 that is upgrading the network appliance. After the upgrade, the network appliance is an upgraded network appliance running the second firmware 1303. After the upgrade, the network appliance is again running service executables in a single execution domain which, by definition, is now the first execution domain, Domain A, which is running upgraded service executables.

FIG. 14 illustrates a high-level flow diagram of a method for dynamically creating upgrade specifications based on per device capabilities 1400 according to some aspects. At block 1401, the method can run an installed firmware in a first execution domain of the network appliance. At block 1402, the method can receive a second firmware that includes a plurality of service executables. At block 1403, the method can initiate a second execution domain in response to receiving an upgrade strategy discovery request. At block 1404, the method can initiate the service executables in the second execution domain and in a safe mode. At block 1405, the method can produce an upgrade planning data by monitoring the plurality of service executables in the second execution domain for a plurality of stage failures at a plurality of execution states. At block 1406, the method can use the upgrade planning data to produce an upgrade specification for upgrading from the installed firmware to the second firmware, wherein a first one of the service executables has an execution state dependency that requires a second one of the service executables to enter one of the execution states before the first one of the service executables enters the one of the execution states, and the upgrade planning data indicates a plurality of execution state dependencies that include the execution state dependency.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system comprising:
a processor configured to produce a specification for a finite state machine that upgrades a network appliance from a first set of service executables to a second set of the service executables, wherein producing the specification includes:
running the first set of the service executables in a live mode in a first execution domain of the network appliance, and running the second set of the service executables in a safe mode in a second execution domain of the network appliance; and
producing the specification in response to receiving upgrade planning data produced by the second set of the service executables, the specification specifying a plurality of states of the service executables in the first set and of the service executables in the second set,
wherein:
each of the service executables are configured to run in a plurality of modes that include the live mode and the safe mode, the service executables running in the live mode providing network services and the service executables running in the safe mode unable to provide the network services; and
the first set includes a service executable configured to program a data plane of the network appliance and the second set includes a second service executable configured to program the data plane.

2. The system of claim 1, wherein the network appliance is configured to produce the upgrade planning data without upgrading the network appliance.

3. The system of claim 1, wherein the second set of the service executables is run in the second execution domain in response to receiving an upgrade strategy discovery request.

4. The system of claim 1, wherein the specification specifies a state that runs at least two of the service executables in serial sequence and in a service order.

5. The system of claim 1, wherein the specification specifies a graceful upgrade.

6. The system of claim 1, wherein the specification specifies a restart.

7. The system of claim 1, wherein producing the upgrade planning data includes detecting a stage failure that indicates that the second set of the service executables is incompatible with a logical interface that is in the first execution domain.

8. The system of claim 1, wherein producing the upgrade planning data includes detecting a stage failure that indicates that the second execution domain has insufficient memory for a packet processing pipeline table duplication operation.

9. The system of claim 1, wherein producing the upgrade planning data includes detecting a stage failure that indicates that the second execution domain has insufficient memory for running the second set of the service executables.

10. The system of claim 1, wherein the finite state machine is configured to move the service executables among a plurality execution states.

11. The system of claim 1, wherein:
the network appliance is automatically upgraded to the second set of the service executables in response to determining that the specification specifies a hitless upgrade.

12. The system of claim 11, wherein:
the second set of the service executables is run in the second execution domain in response to receiving an upgrade strategy discovery request; and
the upgrade strategy discovery request indicates automatically performing the hitless upgrade.

13. The system of claim 1, wherein:
an upgrade report is produced from an upgrade planning data collection received from a plurality of network appliances that produce additional upgrade planning data;
the upgrade report associates the network appliances with a plurality of upgrade types and a plurality of reasons;
one of the upgrade types is a restart upgrade type; and
one of the reasons is insufficient memory.

14. A method comprising:
producing a specification for a finite state machine that upgrades a network appliance from a first set of service executables to a second set of the service executables, wherein producing the specification includes:
running the first set of the service executables in a live mode and in a first execution domain of the network appliance and running the second set of the service executables in a safe mode in a second execution domain of the network appliance; and
producing the specification in response to receiving upgrade planning data produced by the second set of the service executables, the specification specifying a plurality of states of the service executables in the first set and of the service executables in the second set,
wherein:
each of the service executables are configured to run in a plurality of modes that include the live mode and the safe mode, the service executables running in the live mode providing network services and the service executables running in the safe mode unable to provide the network services; and
the first set includes a service executable configured to program a data plane of the network appliance and the second set includes a second service executable configured to program the data plane.

15. The method of claim 14 further including:
producing an upgrade report from an upgrade planning data collection that includes a plurality of upgrade reports that includes the upgrade report,
wherein:
the upgrade report associates a plurality of network appliances with a plurality of upgrade types and a plurality of reasons;
one of the upgrade types is a restart upgrade type; and
one of the reasons is insufficient memory.

16. The method of claim 14, wherein the network appliance is configured to produce the upgrade planning data without upgrading the network appliance.

17. The method of claim 14, wherein the specification specifies a state that runs at least two of the service executables in serial sequence and in a service order.

18. The method of claim 14 wherein the second set of the service executables is run in the second execution domain in response to receiving an upgrade strategy discovery request.

19. The method of claim 14, wherein a control plane of the network appliance runs the first set of the service executables in the first execution domain and runs the second set of the service executables in the second execution domain.

20. A system comprising:

a means for providing a plurality of network services by running first set of service executables in a first execution domain of a network appliance that includes a data plane;

a means for running a second set of the service executables in a second execution domain of the network appliance; and a means for producing, in response to receiving upgrade planning data from the second set of the service executables, a means for specifying a finite state machine configured to upgrade the network appliance from the first set of the service executables to the second set of the service executables, wherein:

each of the service executables are configured to run in a plurality of modes that include a live mode and a safe mode, the service executables running in the live mode providing the network services and the service executables running in the safe mode unable to provide the network services; and the first set includes a service executable configured to program the data plane and the second set includes a second service executable configured to program the data plane.

* * * * *